US009013085B2

(12) United States Patent
Pflueger et al.

(10) Patent No.: US 9,013,085 B2
(45) Date of Patent: Apr. 21, 2015

(54) METHOD FOR PRODUCING A STATOR WINDING OF AN ELECTRIC MACHINE, IN PARTICULAR AN ALTERNATOR

(75) Inventors: Klaus Pflueger, Eberdingen (DE); Martin Henne, Moeglingen (DE); Klaus Herbold, Asperg (DE); Christoph Schwarzkopf, Walheim (DE); Helmut Kreuzer, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 447 days.

(21) Appl. No.: 13/384,540

(22) PCT Filed: May 25, 2010

(86) PCT No.: PCT/EP2010/057144
§ 371 (c)(1),
(2), (4) Date: Jan. 17, 2012

(87) PCT Pub. No.: WO2010/136445
PCT Pub. Date: Dec. 2, 2010

(65) Prior Publication Data
US 2012/0119605 A1      May 17, 2012

(30) Foreign Application Priority Data
May 29, 2009  (DE) .......................... 10 2009 024 231

(51) Int. Cl.
*H02K 3/00*       (2006.01)
*H02K 3/28*       (2006.01)
(Continued)

(52) U.S. Cl.
CPC .. *H02K 3/28* (2013.01); *H02K 3/12* (2013.01); *H02K 15/045* (2013.01)

(58) Field of Classification Search
CPC .......... H02K 3/28; H02K 15/045; H02K 3/32
USPC .................. 310/179–180, 198, 201–202, 208
See application file for complete search history.

(56) References Cited

U.S. PATENT DOCUMENTS 7,825,562 B2 * 11/2010 Naganawa et al. ........... 310/208
8,294,324 B2 * 10/2012 Ishigami et al. .............. 310/206
(Continued)

FOREIGN PATENT DOCUMENTS

DE              103 29 576 A1      2/2005
DE       10 2005 048 094 A1       4/2007
(Continued)

OTHER PUBLICATIONS

International Search Report corresponding to PCT Application No. PCT/EP2010/057144, mailed Sep. 14, 2010 (German and English language document) (15 pages).

*Primary Examiner* — Thanh Lam
(74) *Attorney, Agent, or Firm* — Maginot, Moore & Beck LLP

(57) ABSTRACT

A method is disclosed for producing a stator winding of an electric machine, in particular an alternator, the stator winding comprising at least one phase winding and the phase winding having a plurality of coils, the plurality of coils being wound in one direction, a given number of turns being wound and the coil having a plurality of coil sides, two coil sides of the coil transitioning integrally into coil connectors. The turns of the coil are subsequently moved relative to each other in such a way that the coil sides transitioning into coil connectors are outermost coil sides of the coil.

9 Claims, 20 Drawing Sheets

(51) Int. Cl.
*H02K 3/12* (2006.01)
*H02K 15/04* (2006.01)

(56) References Cited

U.S. PATENT DOCUMENTS

| | | | | |
|---|---|---|---|---|
| 8,330,318 B2 * | 12/2012 | Saito et al. | ............ | 310/214 |
| 8,384,263 B2 * | 2/2013 | Hiramatsu et al. | ............ | 310/208 |
| 2008/0174199 A1 * | 7/2008 | Ishigami et al. | ............ | 310/199 |
| 2008/0201934 A1 | 8/2008 | Ward et al. | | |
| 2008/0201935 A1 | 8/2008 | Nakayama et al. | | |
| 2009/0200888 A1 * | 8/2009 | Tanaka et al. | ............ | 310/195 |
| 2009/0218906 A1 * | 9/2009 | Adachi et al. | ............ | 310/216.069 |
| 2009/0267441 A1 * | 10/2009 | Hiramatsu et al. | ............ | 310/208 |

FOREIGN PATENT DOCUMENTS

| | | |
|---|---|---|
| EP | 1 494 337 A2 | 1/2005 |
| JP | 2005-51981 A | 2/2005 |
| JP | 2006-60880 A | 3/2006 |
| JP | 2008-211880 A | 9/2008 |
| JP | 2009-131103 A | 6/2009 |
| WO | 2008/081020 A2 | 7/2008 |

* cited by examiner

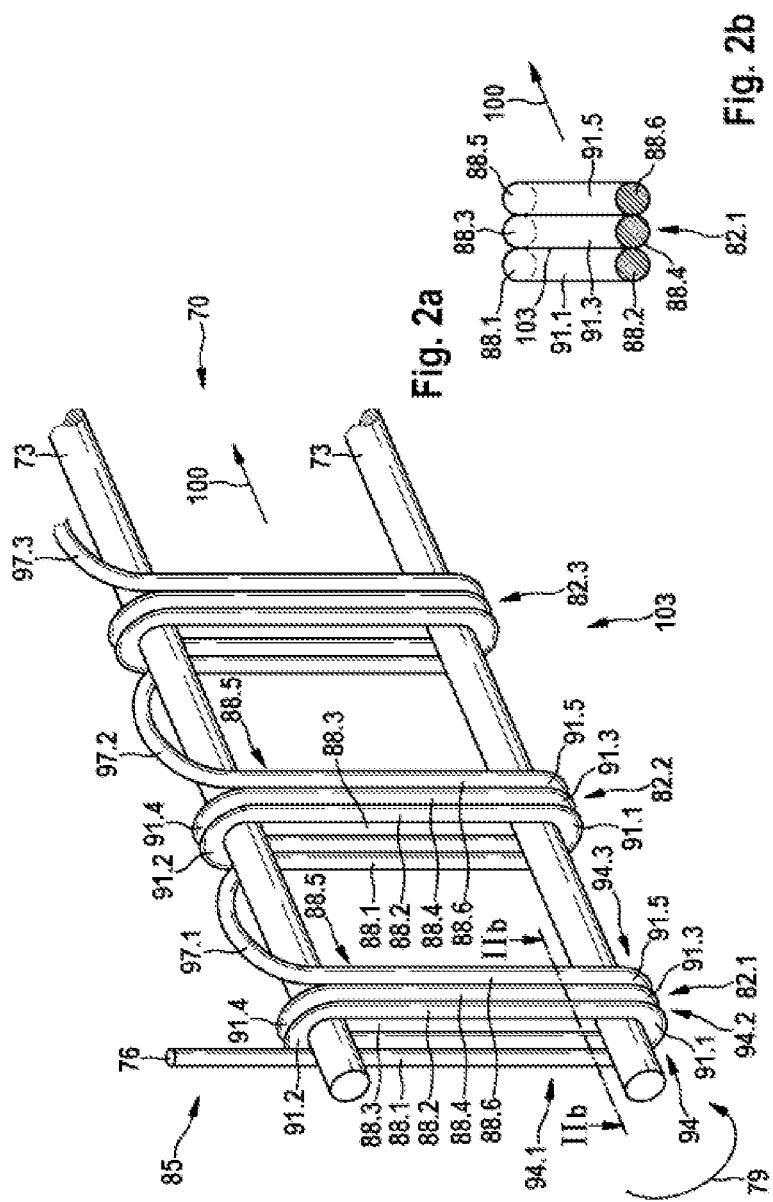

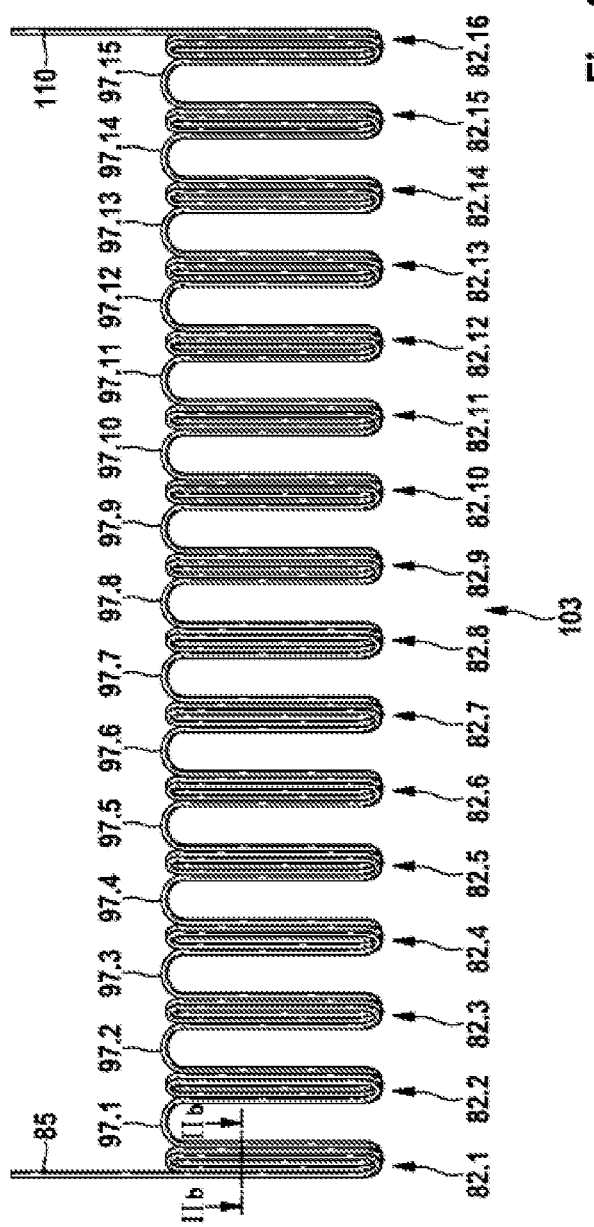

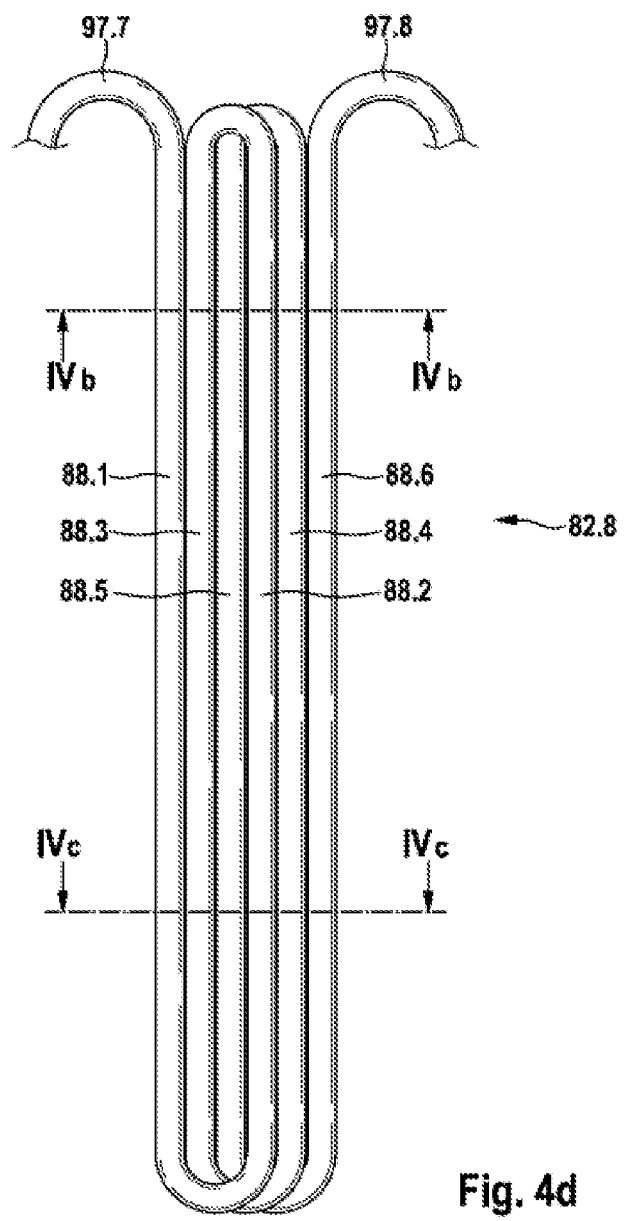

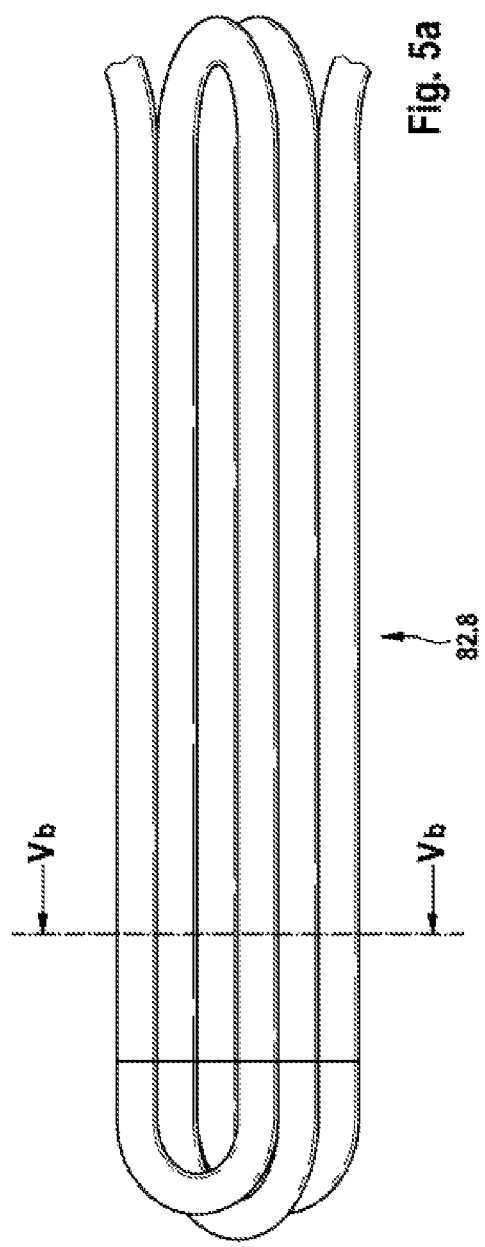
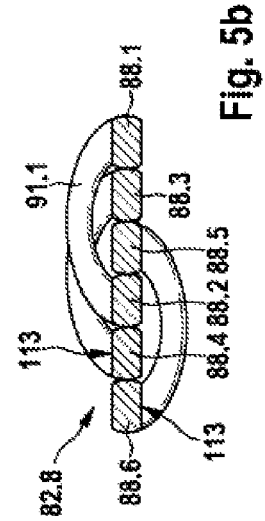

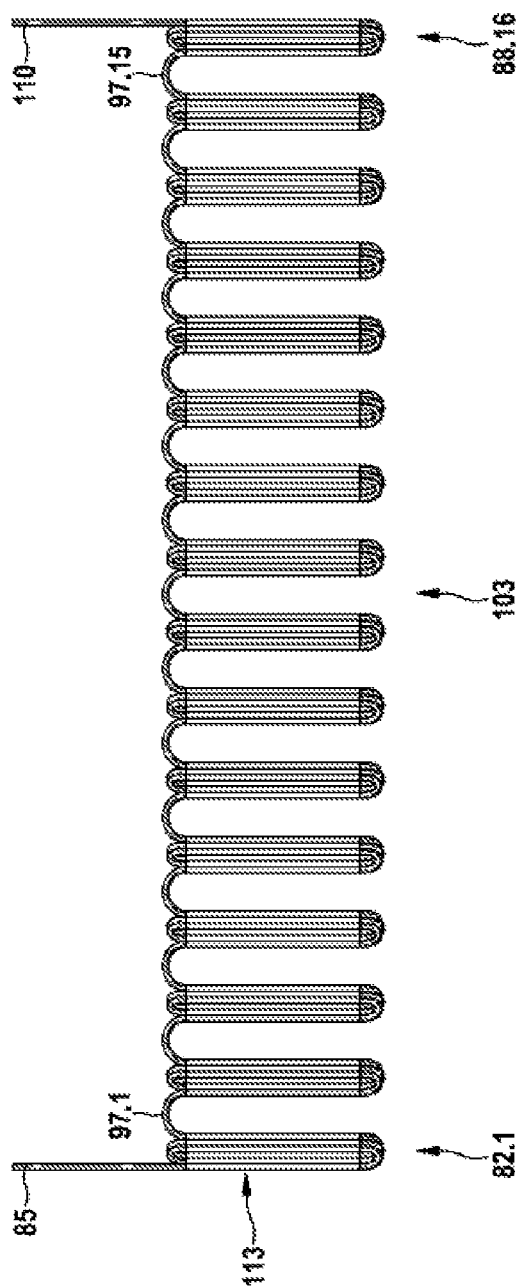

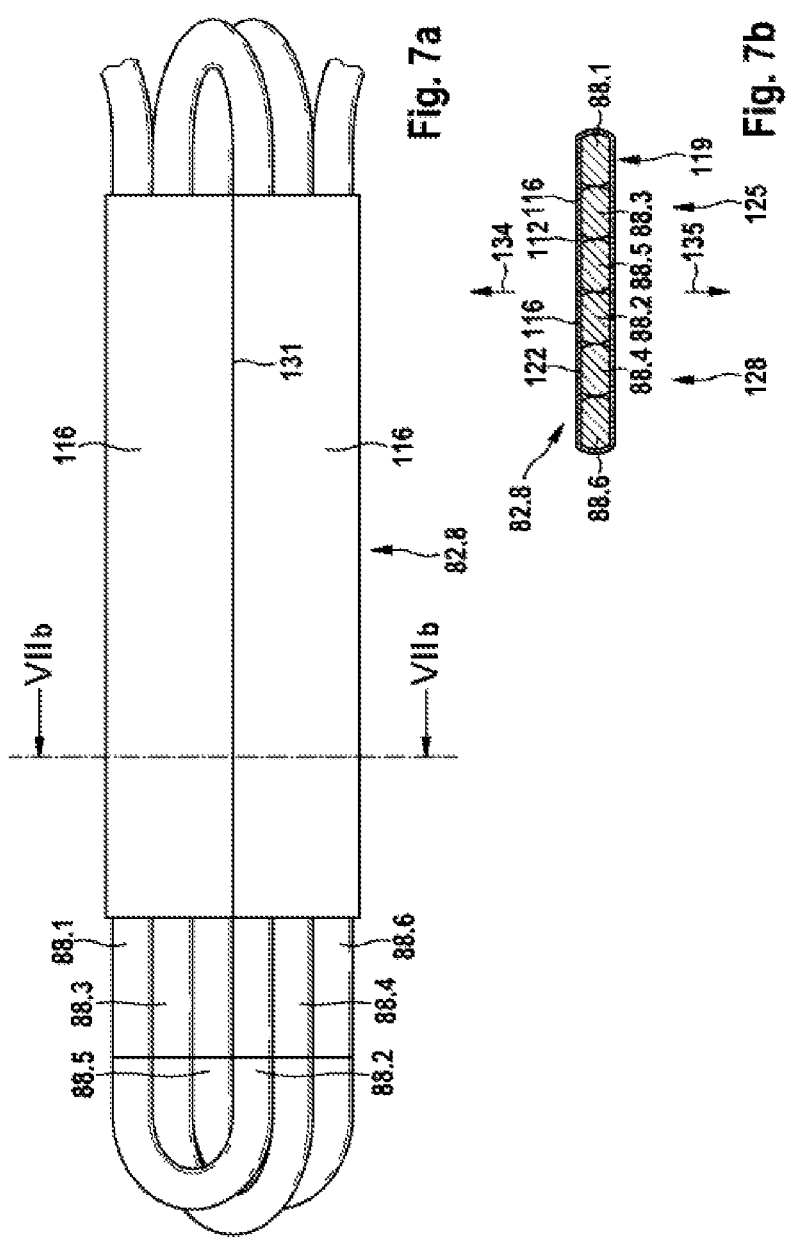

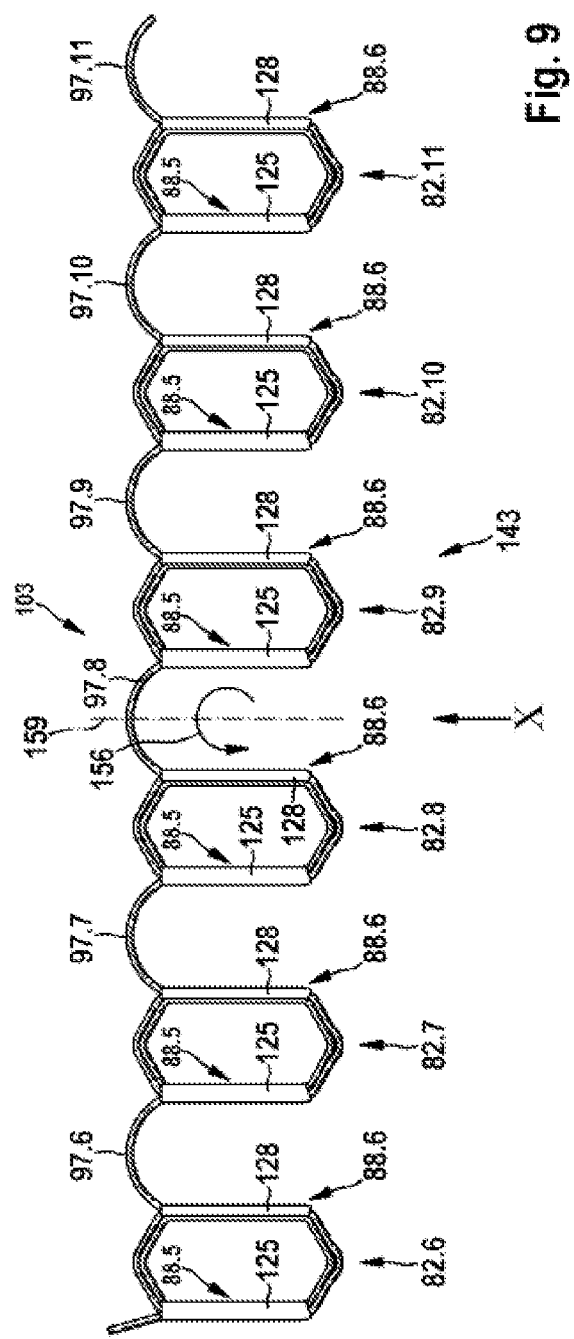

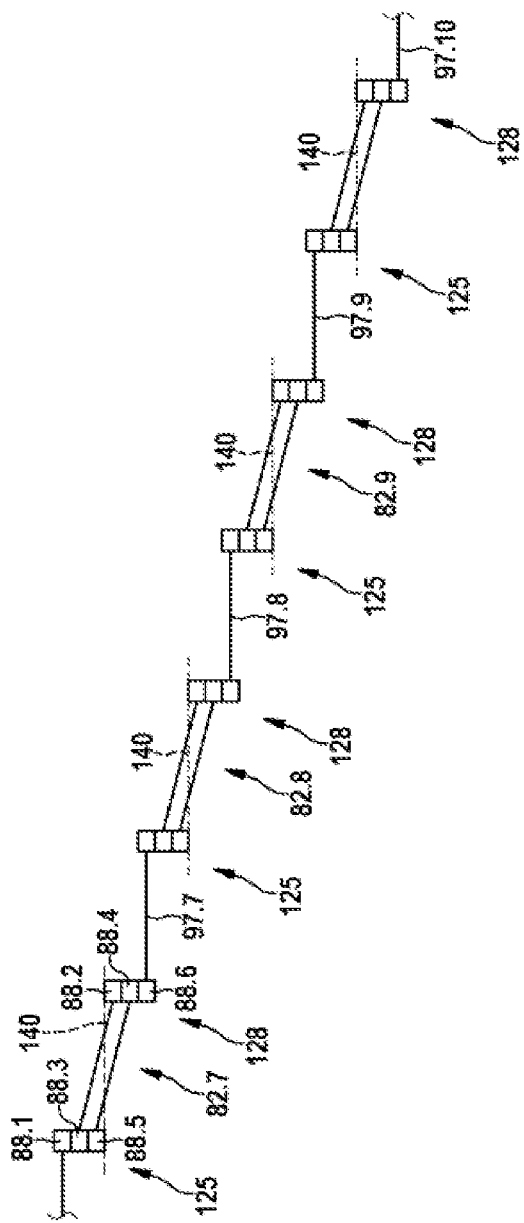

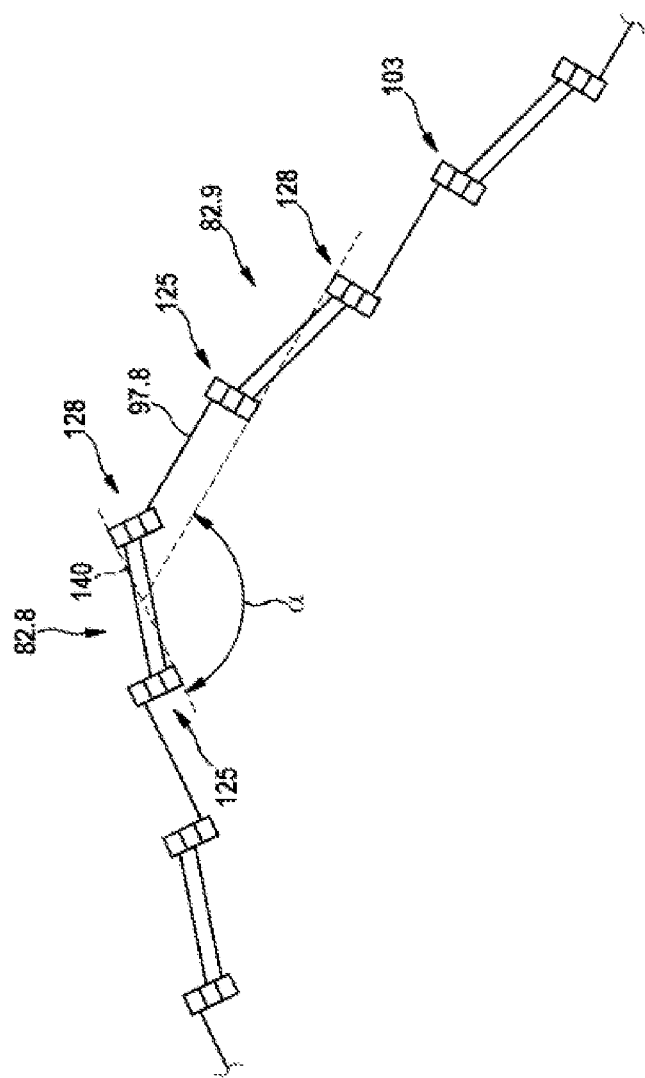

US 9,013,085 B2

METHOD FOR PRODUCING A STATOR WINDING OF AN ELECTRIC MACHINE, IN PARTICULAR AN ALTERNATOR

This application is a 35 U.S.C. §371 National Stage Application of PCT/EP2010/057144, filed on May 25, 2010, which claims the benefit of priority to Serial No. DE 10 2009 024 231.7, filed on May 27, 2009 in Germany, the disclosures of which are incorporated herein by reference in their entirety.

BACKGROUND

The publication WO 2008/081020 A2 has disclosed a method for producing a stator winding of an electric machine in the form of an alternator. Using the method described therein, the winding illustrated therein has a comparatively large number of joints.

SUMMARY

The method according to the disclosure for producing a stator winding of an electric machine having the features of the main claim has the advantage that the stator winding comprises at least one phase winding, which can be produced in a comparatively simple manner continuously from one piece of wire.

The method step provided in accordance with the main claim can be performed efficiently by virtue of the coil sides of a coil being divided into two groups, the two groups being pushed apart from one another. In this case, the two groups are divided into coil sides of one side of the coil and into coil sides of the other side of the coil. This makes it possible to achieve a situation in which the outermost coil sides are those coil sides which enable connections to directly adjacent coils of this wire piece.

In accordance with a further configuration of the features of the disclosure, it is possible to produce a two-layered lap winding which firstly consists of a continuous wire and secondly has a uniform end winding.

Further advantages relating to the features of the further dependent claims can be gleaned from the description.

BRIEF DESCRIPTION OF THE DRAWINGS

Features of the disclosure will be explained in more detail below, by way of example, using the figures, in which:

FIGS. 2a and 2b show a first apparatus for winding a wire and a section through the wound wire, FIG. 5a shows the coil from FIGS. 4a-4d with turns shifted with respect to one another after an embossing operation, FIG. 5b shows a section through embossed coil sides of the turns from FIG. 5a, FIG. 6 shows the coil chain from FIG. 3a with shifted, embossed turns, FIG. 7a shows a three-dimensional view of a coil of the coil chain from FIG. 6 after connection by means of a flat insulating material, FIG. 7b shows a section through the turns of the coil from FIG. 7a, FIG. 8a shows a three-dimensional view of the coil, once the two groups of coil sides of a coil have been pushed apart from one another, FIG. 10 shows a section through the coil chain from FIG. 9, FIG. 11 shows the coil chain from FIG. 10 once the coil chain has been angled.

DETAILED DESCRIPTION

Figure 1:
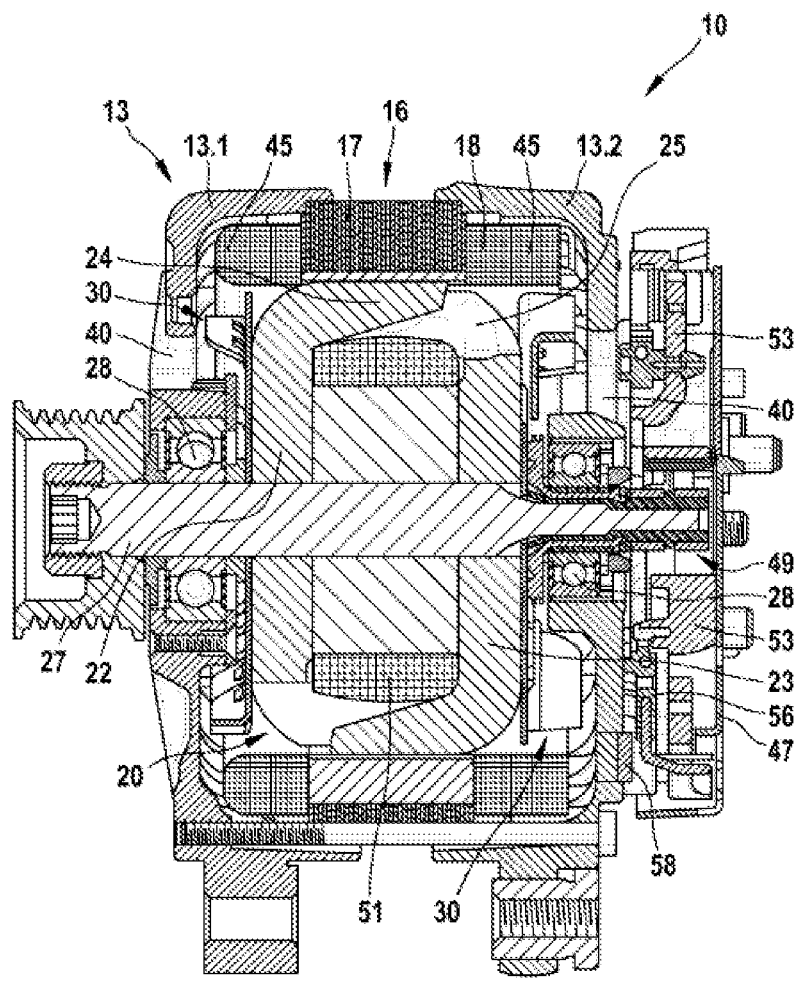
FIG. 1 shows an electric machine in a longitudinal section.

FIG. 1 shows a longitudinal section through an electric machine 10, in this case in the form of a generator or alternator for motor vehicles. This electric machine 10 has, inter alia, a two-part housing 13, which comprises a first end plate 13.1 and a second end plate 13.2. The end plate 13.1 and the end plate 13.2 accommodate a so-called stator 16, which firstly comprises a stator core 17 which is substantially in the form of a circular ring, and a stator winding 18 is inserted into slots of said stator core which are directed radially inwards and extend axially. This ring-shaped stator 16 surrounds a rotor 20 with its slotted surface, which is directed radially inwards, said rotor being in the form of a claw pole rotor. The rotor 20 comprises, inter alia, two claw pole boards 22 and 23, with claw pole fingers 24 and 25, extending in the axial direction, being arranged on the outer circumference of each of said claw pole boards. Both claw pole boards 22 and 23 are arranged in the rotor 20 in such a way that their claw pole fingers 24 and 25, respectively, which extend in the axial direction alternate with one another on the circumference of the rotor 20. This results in magnetically required interspaces between the oppositely magnetized claw pole fingers 24 and 25, which are referred to as claw pole interspaces. The rotor 20 is mounted rotatably in the respective end plates 13.1 and 13.2 by means of a shaft 27 and in each case one roller bearing 28 located on each rotor side.

The rotor 20 has in total two axial end faces, on which in each case one fan 30 is fixed. This fan 30 comprises substantially a plate-shaped or disk-shaped section, from which fan blades emerge in a known manner. These fans 30 provide the possibility of air exchange between the outside of the electric machine 10 and the interior of the electric machine 10 via openings 40 in the end plates 13.1 and 13.2. For this purpose, the openings 40 are provided substantially at the axial ends of the end plates 13.1 and 13.2, via which cooling air is sucked into the interior of the electric machine 10 by means of the fans 30. This cooling air is accelerated radially outwards by the rotation of the fans 30, with the result that it can pass through the winding overhang 45, which allows cooling air to pass through. Owing to this effect, the winding overhang 45 is cooled. Once it has passed through the winding overhang 45 or once it has flowed around this winding overhang 45, the cooling air takes a path radially outwards, through openings not illustrated in this FIG. 1.

In FIG. 1, a protective cap 47 which protects the various components from environmental influences is located on the right-hand side. This protective cap 47 thus covers a so-called slipring assembly 49, for example, which serves the purpose of supplying field current to a field winding 51. A heat sink 53 is arranged around this slipring assembly 49, said heat sink acting as a positive heat sink here. The end plate 13.2 acts as so-called negative heat sink. A terminal plate 56 is arranged between the end plate 13.2 and the heat sink 53 and is used for connecting negative diodes 58 arranged in the end plate 13.2 and positive diodes (not shown in this illustration) in the heat sink 53 to one another and therefore represents a bridge circuit, known per se.

FIG. 2a illustrates a first apparatus 70 for winding. This apparatus 70 has, by way of example, two bars 73 which are arranged parallel to one another. A wire 76 is wound around these two bars. This wire 76 has a diameter of 2 mm, for example. This wire 76 is wound around the two bars 73 towards the left, as illustrated in FIG. 2, i.e. in the counterclockwise direction, as indicated by the arrow 79. In this process, a first coil 82.1 is wound. Moreover, each coil is generally denoted by the reference numeral 82. If it is a specific coil with a specific position, this reference numeral 82 is denoted by a further number, separated by a point, in order to indicate the specific coil. This first coil 82.1 is followed in the same direction of rotation by a second coil 82.2, and this second coil is in turn followed by a third coil 82.3. The coil 82.1 initially has a terminal 85 outside the two bars 73. This terminal 85 is later used for connection to a rectifier in the electric machine. This terminal is followed in the winding direction of the wire 76 initially by a first coil side, which is denoted here by the reference number 88.1. In this description, coil sides are generally denoted by the reference numeral 88. If it is a specific coil side, this is denoted by a further number, which is separated from the reference numeral 88 by a point. A coil side 88.1 is followed by a coil side connector 91.1, which is likewise denoted generally here by the reference numeral 91, but in a specific case is again denoted by a further supplementary number, separated by a point. The coil side connector 91.1 is followed by a second coil side 88.2, the coil side 88.2 is followed by a coil side connector 91.2, and this is in turn followed by a further coil side 88.3, which is partially hidden here by the coil sides 88.1 and 88.2. This third coil side 88.3 is positioned adjacent to the coil side 88.1. The coil side 88.3 is followed by the coil side connector 91.3, which is followed by the coil side 88.4. The coil side 88.4 is adjoined by the coil side connector 91.4. The coil side connector 91.4 is followed by a further coil side 88, in this case specifically the coil side 88.5, but this is completely hidden by the coil sides 88.2 and 88.4. The coil side 88.5 is followed by the coil side connector 91.5, which transitions integrally into the coil side 88.6. This first coil 82.1 has three turns 94 in accordance with the design described here. These three turns are a first turn 94.1, followed by a second turn 94.2 and a third turn 94.3, which are each specific turns.

The third turn 94.3 is followed integrally by a coil connector 97, which, as a specific coil connector 97.1, connects the coils 82.1 and 82.2 to one another integrally. The design of the second coil 92.2 is the same, apart from the starting piece, which is the coil connector 97.1 in this case. Correspondingly, the coil connector 97.1 is followed by a coil side 88.1, and this is followed by a coil side connector 91.1 etc., as far as the coil side 88.6, as has already been described above for the coil 82.1. After the coil side 88.5, the coil 82.2 transitions into the coil connector 97.2. The coil connector 97.2 is followed by the third coil 82.3 with the same design as the coil 82.2, but this is not described in any more detail here since it has the same design as that described above for the coil 82.2.

FIG. 2b shows a section through the first coil 82.1 with the winding sides 88.1 to 88.6 and the three coil side connectors 91.1 to 91.3. As can be seen, the coil 82.1 is wound in the direction 100, see also FIG. 2a. This direction 100 is arranged substantially perpendicular to a plane of a turn 103 or perpendicular to the longitudinal axes of the bars 73.

Provision is made for the arrangement of a plurality of coils 82 described in FIG. 2a to be embodied such that in total sixteen coils 82, as described in relation to FIG. 2a, are wound over the bars 73 so as to be "connected" in series with one another. The number of in total sixteen coils 82 therefore depends on the overall requirement being to configure an electric machine with a 16-pole design.

The wire arrangement produced on the first apparatus 70 is a precursor 103 to a phase winding.

If the precursor 103 is drawn off the first apparatus for winding 70, the precursor 103 shown in full in FIG. 3a for a phase winding can be seen. This precursor 103 shows the terminal 85 at which the winding was begun and a terminal 110, at which the winding was ended. In total sixteen coils 82, which are denoted by the reference numerals 82.1 to 82.16 in FIG. 3a, are arranged between the two terminals 85 and 110.

Figure 3B:
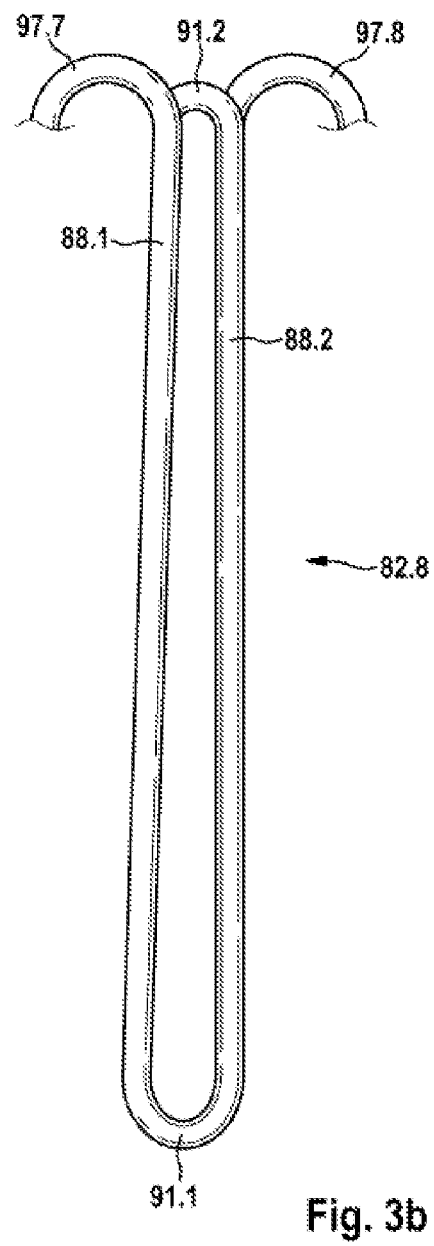
FIG. 3a shows a coil chain, once it has been removed from the apparatus shown in FIG. 2a, FIG. 3b shows a detail view of a coil of the coil chain from FIG. 3a, FIG. 4a shows a section through a coil from FIG. 3b and how the turns of the coil are shifted with respect to one another.

FIG. 3b shows a plan view of the coil 82.8. The coil connector 97.7 is followed by the coil side 88.1, the coil side connector 91.1, the coil side 88.2, the coil side connector 91.2 etc. As can also be seen from this side view, the coil side connectors 91.1 and 91.2 are wound around the bars 73 with different radii. It can therefore be seen that the bar 73, which is arranged closer to the coil connectors 97 than the other bar 73, has a different, smaller radius than the bar 73 which is more remote from the coil connectors 97. Therefore, for example, the coil side connector 91.2 has a smaller bending radius than the coil side connector 91.1.

Figure 4A:
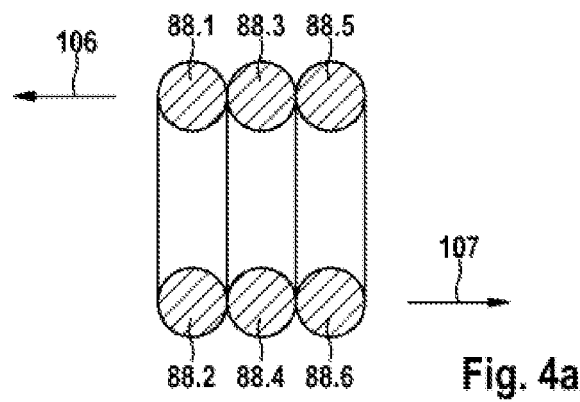
FIGS. 4b and 4c show the position of the turns of the coil from FIG. 4a after the shifting.
FIG. 4d shows a plan view of the coil after the shifting.
Figure 4B:
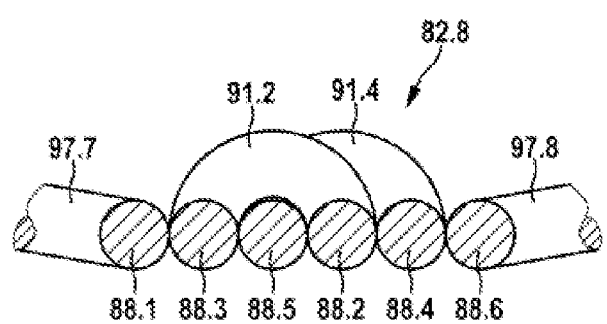

With reference to FIG. 2b, which shows a section through a coil 82 or through the coil 82.1, FIGS. 4a and 4b show how the turns 94 of a coil 82 are shifted with respect to one another. The relative shift between the coil sides 88.2, 88.4 and 88.6 with respect to the coil sides 88.1, 88.3 and 88.5, which is indicated by two arrows 106 and 107, respectively, in FIG. 4a, is also superimposed with a further movement, which results in the coil sides 88.1, 88.3 and 88.5 coming to lie in one plane adjacent to the coil sides 88.2, 88.4 and 88.6. The relative shift according to the arrows 106 and 107 corresponds to the direction 100 in FIG. 2a. The further superimposed movement is perpendicular to the relative shift according to the arrows 106 and 107 and perpendicular to the wire direction of the coil sides 88.

Furthermore, the coil connectors 97.7 and 97.8 are illustrated (see also FIG. 3a). After this shifting of coil sides 88, ideally the coil sides 88.1 to 88.6 are positioned next to one another in one plane. In accordance with the state sketched in FIG. 4b, for example, the coil side connector 91.2, the coil side 88.5 and the coil side connector 91.4 do not overlap a coil side 88.

Figure 4C:
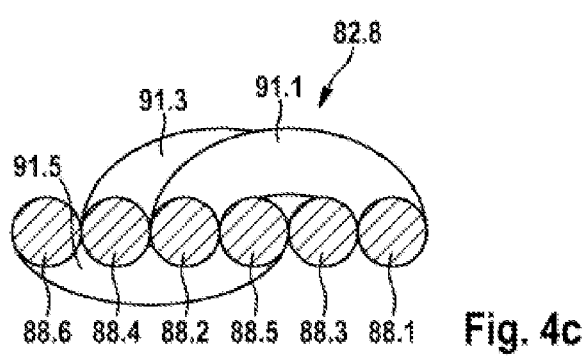

While FIG. 4b shows the situation of the coil 82.8 on the side of the coil connectors 97.7 and 97.8, FIG. 4c shows the situation of the coil 82.8 on the opposite side of the coil 82.8, on which there is no coil connector 97 arranged. As can clearly be seen, the coil side connectors 91.1 and 91.3 overlap the coil sides 88.3 and 88.5 and, respectively, the coil sides 88.5 and 88.2 there. The result of this shifting is that the coil sides 88.1 and 88.6 transitioning into coil connectors 97.7 and 97.8 are outermost coil sides 88, in this case 88.1 and 88.6, of a coil 82, in this case 82.8.

The disclosure therefore describes a method for producing a stator winding 18 of an electric machine 10, in particular an alternator, the stator winding 18 having at least one phase winding, preferably three, five, six or seven phase windings, and the phase winding having a plurality of coils 82.1 to 82.16, the plurality of coils 82 being wound in a direction 100, which is preferably perpendicular to a turn plane 103, a specific number of turns 94 being wound. The coil 82 has a plurality of coil sides 88, two coil sides 88 of the coil 82 transitioning integrally into coil connectors 97. Then, the turns 94 of a coil 82 are shifted with respect to one another in such a way that the coil sides 88 transitioning into coil connectors 97 are outermost coil sides 88 of a coil 82.

FIG. 4d shows a plan view of the shifted coil 82.8. In conjunction with the sections shown in FIG. 4b and FIG. 4c, the position and arrangement of such a coil 82.8 after the shifting can readily been seen.

In an optional working step, provision is made for the coil sides 88.1 to 88.6, which are adjacent to one another in FIG. 4d, to be embossed perpendicular to the plane in which these coil sides 88.1 to 88.6 are arranged, as shown in FIG. 4d. This embossing step means that it is possible to markedly increase a slot space factor in a slot.

Accordingly, provision is optionally made for, after the shifting of the turns 94 of a coil 82 with respect to one another such that the coil sides 88.1, 88.6 transitioning into coil connectors 97 are outermost coil sides 88.1, 88.6 of a coil 82. Provision is in the process made for at least one of the coil sides 88.1 to 88.6, but preferably all of the coil sides 88.1 to 88.6 of the coil 82, to be embossed (see also FIGS. 5a and 5b).

The coil sides 88 illustrated in FIG. 5b are embossed so as to have parallel flanks. In addition to such embossing with parallel flanks, it is also possible, for example, to emboss an overall substantially trapezoidal cross section of the coil sides 88.1 to 88.6. This is dependent on whether the coil sides 88.1 to 88.6 are intended to be introduced into a rectangular slot, as is the case for the example illustrated in FIG. 5b, or whether the coil sides are intended to be introduced into a more trapezoidal slot, in which the slot flanks are oriented precisely radially inwards, for example (see FIG. 1).

Each of the coil sides 88.1 to 88.6 illustrated in FIG. 5b has mutually opposite embossed-on portions 113. For reasons of clarity, only a few of the embossed-on portions 113 are annotated correspondingly.

As a deviation from the above, the following situation would result with two or four turns of a coil 82:

if the coils 82 were wound with only two turns 94, for example, the coil sides 88.5 and 88.6 would not exist. The coil side connector 91.2 would thus not overlap a coil side 88.5 in projection. A coil side connector 91.1 would only overlap the coil side 88.3 in projection (similarly to FIG. 4c). The coil side 88.4 would be followed by the next coil connector 97.

If the coils 82 were wound with four turns 94, for example, the coils 82 would also have the coil sides 88.7 and 88.8. This would mean that not only two coil side connectors 91.2 and 91.4, but a further coil side connector 91.6, would be present on the side of the coil connectors 97, and this further coil side connector would likewise overlap a coil side 88 in projection. Furthermore, the coil side connectors 91.1 and 91.3 and a coil side connector 91.5 would each overlap three coil sides 88 on the opposite side.

The coil side connector 91.4 can also lie in the plane of the coil sides 88 (FIG. 4b). The same would apply to a coil side connector 91.6 for the case of four turns 94 per coil 82. In the case of only two turns 94 per coil 82, the coil side connector 91.2 could also be arranged merely in the plane of the coil sides 88.

FIG. 6 illustrates the precursor 103 for a phase winding once the coil sides 88 have been embossed, as shown in FIG. 5b and described in relation thereto.

FIG. 7a shows an individual coil 82.8 illustrated after the embossing. The difference in relation to the coil 82.8 shown in FIG. 5a consists in that the coil sides 88.1 to 88.6 have been connected fixedly to one another by a connecting means 116. This connecting means 116 is a flat insulating material, for example insulating paper or an insulating fiber material. This insulating paper or this insulating material has an adhesive on one side facing the coil sides 88.1 to 88.6, said adhesive being used to fixedly connect the coil sides 88.1 to 88.6 to the insulating material. This insulating material or this connecting means 116 connects the coil sides 88.1 to 88.6 in such a way that two groups are formed, which each consist of three coil sides. FIG. 7b shows a cross section through the coil 82.8. Thus, this figure shows the three coil sides 88.1, 88.3 and 88.5, which are adjacent to one another and are connected to one another by means of an insulating material, as connecting means 116, which is laid in the form of a U around these three coil sides 88.1, 88.3 and 88.5, which are arranged in a row. The insulating material has a layer 119, which is formed by an adhesive 122. The group 125 formed by the coil sides 88.1, 88.3 and 88.5 is fixedly connected to one another by the connecting means 113. The same applies to the group 128, which consists of or comprises the coil sides 88.2, 88.4 and 88.6. Therefore, the coil sides 88 of the two groups 125 and 128 are connected to one another fixedly by a connecting means 113.

The adhesive bonding by means of the insulating material around in each case three coil sides 88 can be performed in two different ways, for example: in the first embodiment, it is possible, for example, for adhesive bonding to be performed in the form of a U by means of an insulating material 116 or insulating paper around three mutually adjacent coil sides 88. The same procedure can be followed for the other three coil sides 88, with the result that, ideally, two U-shaped sets of insulating material 116 (as illustrated in FIG. 7b) are positioned opposite one another with their limbs. In one alternative, for example, it is also possible for adhesive bonding to be performed around all six coil sides 88.1 to 88.6 by means of an integral insulating material 116 or insulating paper. In a further step, the insulating material 113 would then be intersected between the two innermost coil sides 88.2 and 88.5 on both sides along a join 131 between the two innermost coil sides 88.2 and 88.5 on both sides and thus a connection between the two groups 125 and 128 would be broken.

In a following step, which can possibly also be performed readily without the abovementioned connection of the individual coil sides, the two groups 125 and 128 are separated physically from one another. This operation is indicated in FIG. 7b by the two arrows 134 and 135, which point in mutually opposite directions and indicate the directions in which, in a following step, the groups 125 and 128 are intended to be moved.

Figure 8A:
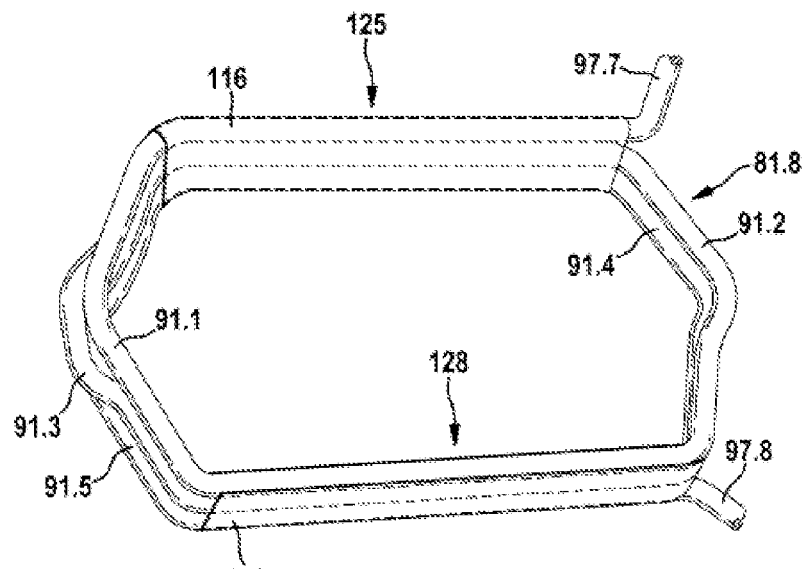
FIG. 8b shows a section through the coil sides from FIG. 8a, FIG. 9 shows the coil chain from FIG. 6 once the two groups of coil sides of a coil have been pushed apart from one another.
Figure 8B:
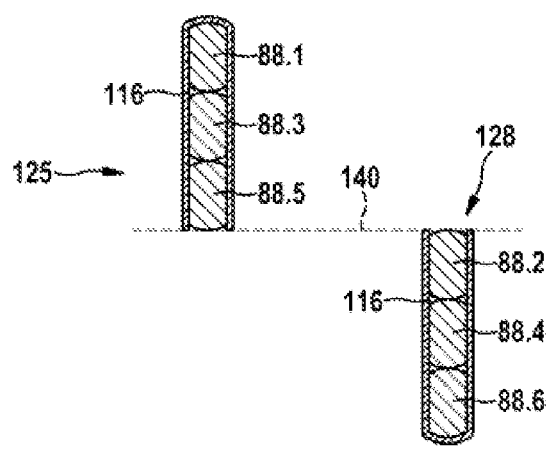

FIG. 8a and FIG. 8b show the coil 82.8 pushed apart from one another. FIG. 8a shows a three-dimensional illustration of the coil 82.8, FIG. 8b shows a section through the coil sides 88.1 to 88.6 of the coil 82.8 pushed apart from one another. The two groups 125 and 128, pushed apart from one another, are clearly shown. The coil side connectors 91.1 to 91.5 generally later form, in the final state of the phase winding, the winding overhang 45, overall. In addition, a plane 140 is described in FIG. 8b which is defined in principle by those surfaces of the coil sides 88.5 and 88.2 which were once directed towards one another. Both coil sides 88.5 and 88.2 are linear and parallel to one another (ideally).

FIG. 9 shows a detail of part of the precursor 103 once the groups 125 and 128 of each coil 82 have been pushed apart from one another. In FIG. 9, each coil 82.6 to 82.11 and moreover each further coil 82 of the precursor 103 has a plane 140, as is sketched in FIG. 8b.

FIG. 10 shows a schematic section through the precursor 103 from FIG. 9. In this figure, the illustrated planes 140 can easily be seen.

In a further step, provision is made for each precursor 103 to be reformed. In this case, the following condition should apply: each phase winding or precursor 103 thereof has in each case at least two coils connected in series, in this case 82.8 and 82.9, for example, which in this case are connected in series by the coil connectors 97.8. Each coil 82.8 or 82.9 has a plane 140 between the two groups 125 and 128. In accordance with the provided method step, provision is made for the at least two coils 82.8 and 82.9 to be arranged with respect to one another in such a way that their respective planes 140 are arranged at an angle α with respect to one another of less than 180 angular degrees (FIG. 11).

Figure 12:
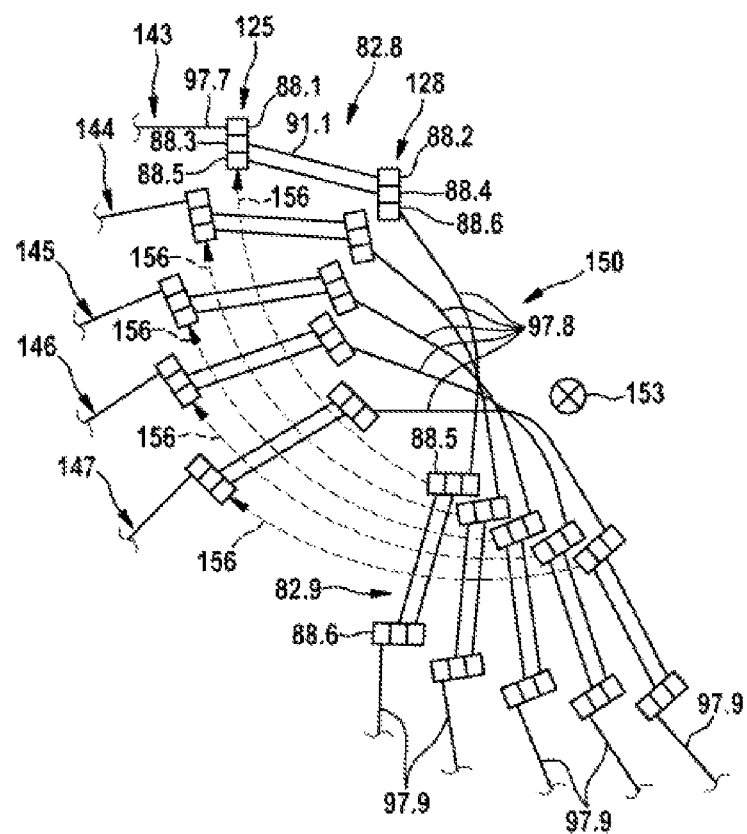
FIG. 12 shows a sectional illustration of a plurality of coil chains once the phase windings of corresponding coil chains have been angled and placed on top of one another and one above the other.

FIG. 12 illustrates, schematically, in total five different precursors 103. Each of these precursors 103 represents what will become a phase winding. This means ultimately that these five phase windings become part of a stator winding 18, which has five phases. It will be noted at this juncture that the previously described winding design is in principle also applicable to three-phase or even two sets of three-phase stator windings 18. FIG. 12 illustrates how the individual precursors 103 of the phase windings 143, 144, 145, 146 and 147 are positioned one after the other and one above the other at a placement point 150 in wire direction 153 of the coil sides 88.1 to 88.6. Accordingly, first the precursor 103 or the phase winding 143 is arranged, then the next phase winding 144 with its coil connector 97.8 is positioned onto the coil connector 97.8 of the phase winding 143. The further phases 145 to 147 then follow with the respective coil connectors 97.8. Furthermore, FIG. 12 shows that, subsequently, different coils 82 are joined to one another. In the example, the individual phase windings 143 to 147 each have sixteen coils 82, i.e. the coils 82.1 to 82.16. In the center of the phase windings 143 to 147, i.e. in the coil connector 97.8, the phase windings 143 to 147 or the two halves of the phase windings 143 to 147 which are arranged to the right and left of the central coil connector 97.8 are arranged at an angle with respect to one another. The halves of the phase windings 143 to 147 which are each arranged on both sides of the coil connector 97.8 are now folded one on top of the other, as indicated by the arrow 156. As is illustrated in FIG. 12, the coil sides 88.5 of the coil 82.8 which is laid next to the coil connector 97.8 on one side are therefore placed on the coil side 88.5 of the other adjacent coil 82.9. The same applies to the other phase windings 144 to 147.

The plurality of phase windings (143, 144, 145, 146, 147) have in each case at least one coil (82) in two directions starting from the placement point (150), in each case at least one first coil (82.8, 82.9) being arranged in a first direction and in a second direction, and the procedure being such that the first group (125) of a first coil (88.9) in one direction is folded onto a first group (125) of a first coil (88.8) in the other direction.

With reference to FIG. 9, which illustrates a center 159 of the phase winding 143, the following is achieved when the groups are folded one on top of the other as shown in FIG. 12: the coil side 88.5 of the coil 82.9 is positioned onto the coil side 88.5 of the coil 82.8, the coil side 88.5 of the coil 82.10 is positioned onto the coil sides 88.5 of the coil 82.7, the coil side 88.5 of the coil 82.11 is positioned onto the coil side 88.5 of the coil 82.6 and so on and so forth, until finally (not illustrated here) the coil side 88.5 of the coil 82.16 is positioned or folded onto the coil side 88.5 of the coil 82.1.

Figure 13:
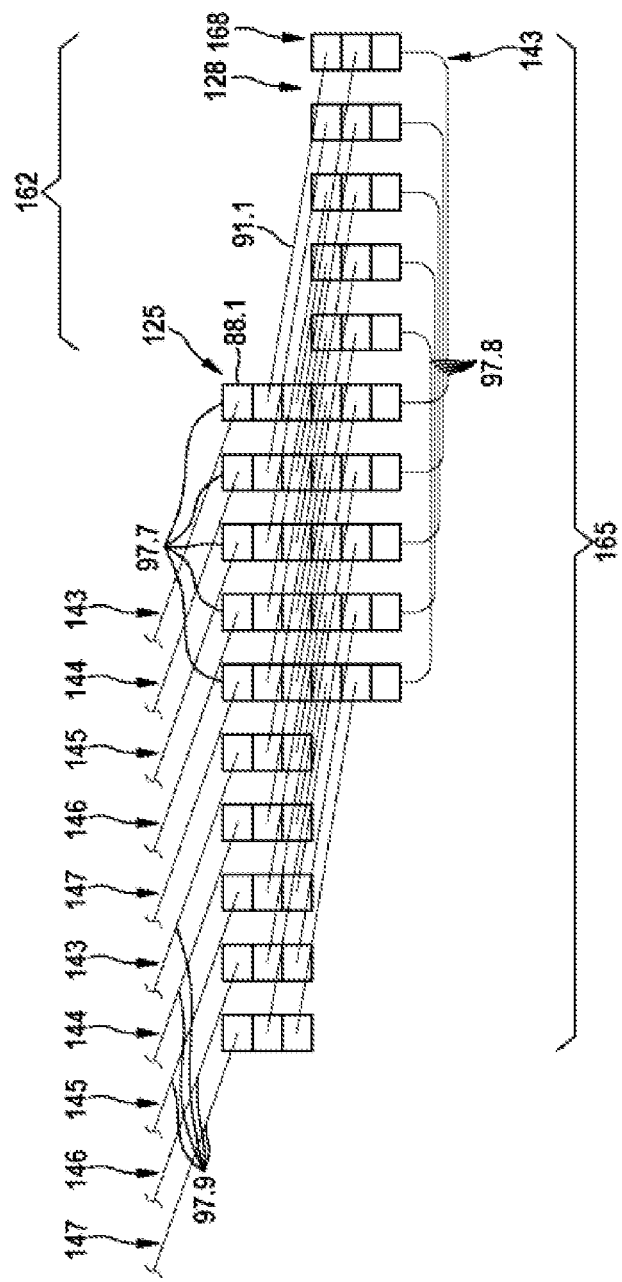
FIG. 13 shows a plurality of, in this case five, coil chains after the operation of folding coil sides one on top of the other.

FIG. 13 illustrates the state resulting from the adjacent coils 82.8 of the individual phases 143 to 147 being folded onto the coils 82.9 of the phase windings 143 to 147. In order to simplify the illustration and for clarity thereof, rectangles have been used as a symbolic cross section in the view for the coil sides.

During the folding one on top of the other, in this case a so-called winding overhang 162 results, which will be discussed later. For the case in which the stator winding 18 has only three phase windings, for example, the winding overhang 162 is not provided by five groups 128, as illustrated, but by merely three groups 128.

If the phase windings 143 to 147 are folded one on top of the other, as illustrated and explained in reference to FIG. 12 and FIG. 13, in the case of a pole pair number of sixteen, so-called winding regions, referred to as subgroups 165, are produced. These subgroups 165 consist of ten coils 82 in the case of a total of five phase windings 143 to 147 in accordance with the method described here. The subgroup 165 illustrated in FIG. 13 in this case consists of the coils 82.8 of the phase windings 143 to 147 and the coils 82.9, correspondingly of in total ten coils 82. By virtue of the halves of the phase windings 143 to 147 being folded one on top of the other as described, in total eight subgroups 165 which each comprise ten coils 82 are thus produced. Starting from one end 168, correspondingly first five coils 82.8, which make up one half of a subgroup 165, follow, and these are followed by five coils 82.9, which make up the second half of the subgroup 165. The second subgroup 165 is formed from the five coils 82.7 and the five coils 82.10. This scheme continues until the eighth subgroup 165, in which half the subgroup is formed by the coils 82.1 (five times) and the other half of five coils is formed by the coils 82.16.

In a more abstract form, the halves of a plurality of phase windings 143 to 147 can be folded one on top of the other in such a way that the plurality of phase windings 143 to 147 each have n coils in two directions, starting from the placement point 150. This means for the case described here that in each case n=8 coils 82 are arranged firstly towards the right and secondly towards the left (see also FIG. 9). Starting from the center 159 of a phase winding 143 to 147, this means that in each case a first coil 82.8 or 82.9 is arranged in a first direction (towards the left) and in a second direction (towards the right). Here, the procedure is such that the first group 125 of a first coil 88.9 in one direction is folded onto a first group 125 of a first coil 88.8 in the other direction.

This operation is likewise also performed for the two next coils 82.7 and 82.10 starting from the center 159 of a phase winding 143 to 147. The same applies to the third next coils 82.6 and 82.11 and so on and so forth.

Figure 14:
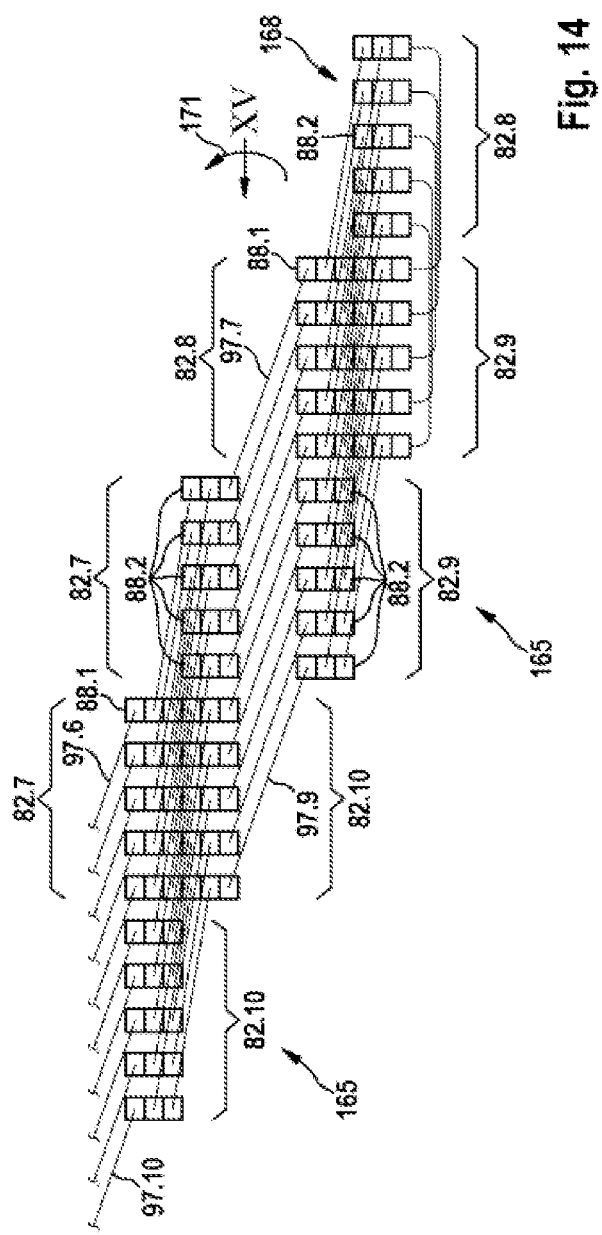
FIG. 14 shows a further step, in which subgroups which are produced are folded one on top of the other.

As is shown in FIG. 14, subgroups 165, which are connected to one another by coil connectors 97.7 and 97.9 or 97.6 and 97.10 or 97.5 and 97.11 or 97.4 and 97.12 or 97.3 and 97.13 or 97.2 and 97.14 or 97.1 and 97.15, are produced by the halves of the phase windings 143 to 147 being folded one on top of the other, respectively.

Figure 15:
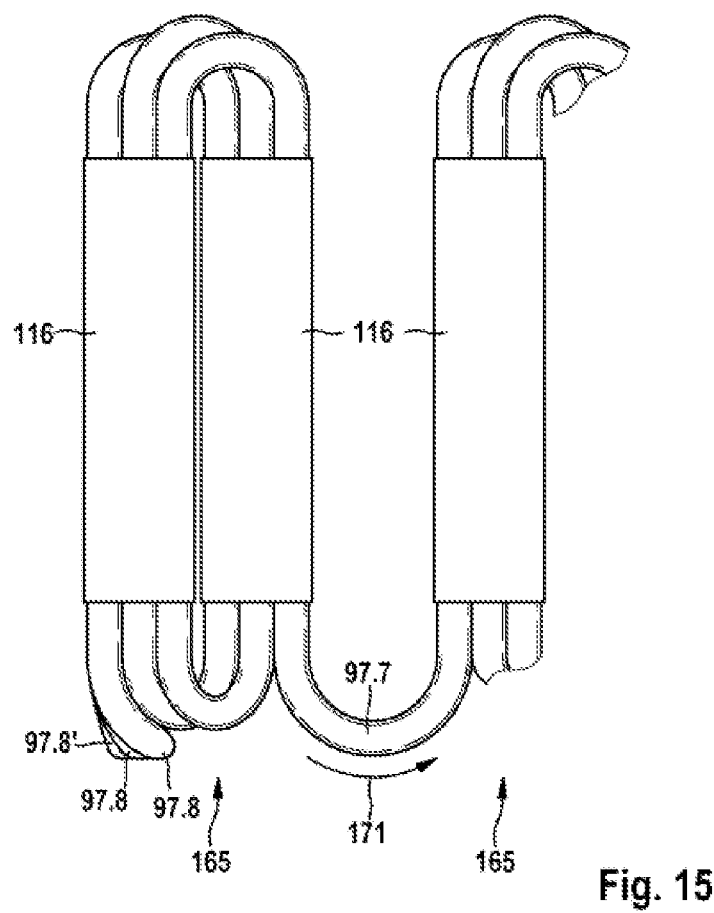
FIG. 15 shows a side view after the operation indicated in FIG. 14 has been performed.

FIG. 15 shows a side view of the first subgroup 165 and partially also of the second subgroup 165.

Figure 16:
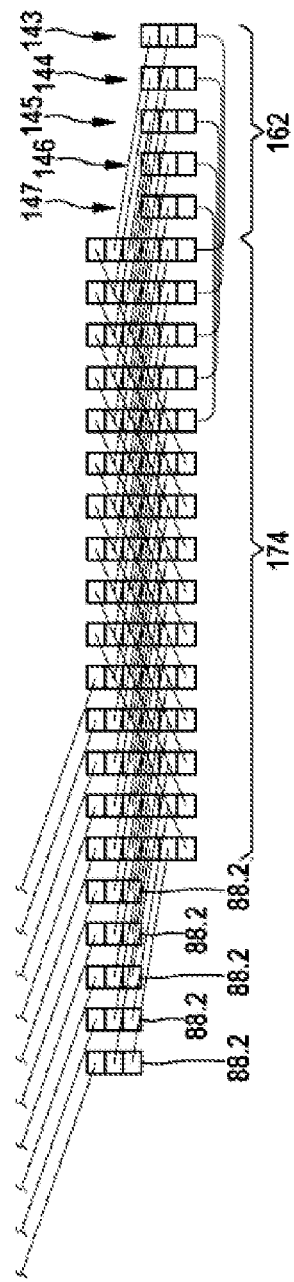
FIG. 16 shows, schematically, two adjacent subgroups after the overturning.

In a further step, provision is made for the subgroups 165 to be rotated relative to one another. This rotation is illustrated in FIG. 15 by a corresponding arrow 171. With reference to FIG. 14, this means that the subgroup 165 illustrated on the very right in FIG. 1 is "turned over", as is likewise illustrated in said figure by the arrow 171, i.e. the coil sides 88.2 of one subgroup 165 are positioned onto the coil sides 88.2 of the other, next subgroup 165. This then produces a constellation as illustrated in FIG. 16. That section of the stator winding 18 which is denoted by the reference numeral 174 has reached the final state of the stator winding 18 before insertion into the stator core, at least on the side forming the winding overhang 162. The "turning-over" operation can also be described such that in each case two adjacent subgroups 165 are moved with respect to one another by being bent in such a way that left coil sides 88 of a subgroup 165 are folded onto left coil sides 88 of a directly adjacent subgroup 165.

The two groups 125 and 128 each have the same number of coil sides 88. In accordance with the exemplary embodiment illustrated here, the number of coil sides 88 of each group 125 or 128 is three in each case. Depending on the design of the winding, the number of coil sides 88 can also be two or four or five, for example, in any case an integral multiple.

Figure 17:
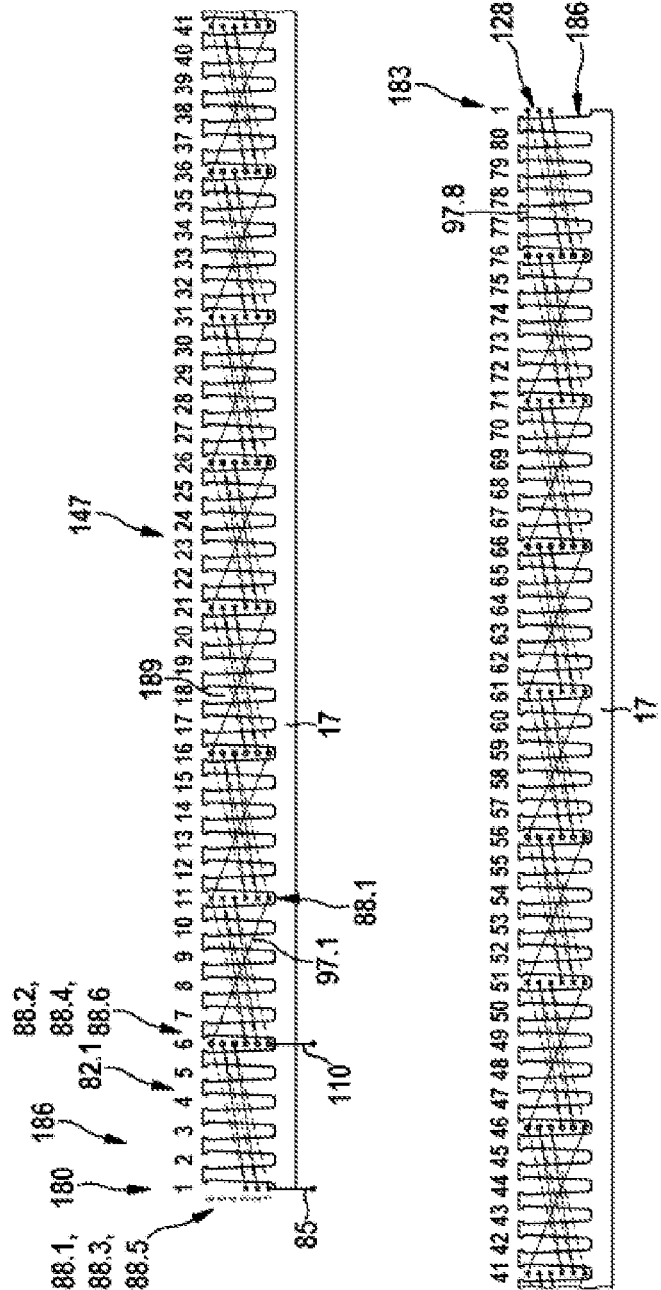
FIG. 17 shows, by way of example, a phase winding in a right-parallelepipedal stator core.

FIG. 17 shows, by way of example, the phase winding 147. This positioning results when, into a substantially right-parallelepidal stator core 17, the completely manufactured stator winding 18, i.e. once even the last subgroup 165 has been turned over, is inserted into a right-parallelepidal stator core 17. The stator core 17 comprises a plurality of or a large number of laminations, which are stacked. Such a design is known in principle from WO-2001 054 254 A1. In the case of the present stator core 17 shown in FIG. 17, the difference over the prior art described therein is that the stator core 17 has in each case half a slot 186 at the start 180 and at the end 183 as well. In total 79 slots 189 are arranged between the two half-slots 186. In principle, a stator core as is used in the mentioned laid-open specification, i.e. one with slots 189 which are whole in respect of this exemplary embodiment 80, can also be used. The terminal 85, which is passed substantially axially out of the half-slot 186, is located in the slot 1 or this half-slot 186. The terminal 110 is located in the slot 189 with the slot number 6. The coil 82.1 is arranged with its coil sides 88.1, 88.3 and 88.5 in the slot 189 with the slot number 1, i.e. the half-slot 186 at slot position 1, while the coil sides 88.2, 88.4 and 88.6 are positioned in the slot 189 with the slot number 6. On the left next to the half-slot 186 at slot position 1, in total 6 numerals are specified which denote the slot position, with an increasing sequence. Thus, the coil side 88.1 is arranged in the slot position 1 of the half-slot 186, above this the coil side 88.3 and again above this the coil side 88.5. Correspondingly, the coil side 88.2 is located in the slot 189 with the slot number 6 in slot position 4, the coil side 88.4 is located in the slot position 5 and the coil side 88.6 is located in slot position 6. The first coil connector 97.1 emerges from the slot 189 with slot number 6 in order to continue, in slot position 1 of slot 189 with slot number 11, with a coil side 88.1 again. The winding continues with this sense until group 128, inclusive, after slot 189 with slot number 80 in order then to return to slot 189 with number 6 by means of a coil connector 97.8 (see also FIG. 13).

The other four phase windings 143 to 146 have a similar design to this phase winding 147. The phase winding 146 is therefore located with its terminal 85 in the slot 2, and all other winding sections are shifted towards the right merely by one slot in respect to the phase winding 147, with the result that the group 128 arranged furthest left is no longer at slot position 1, but at slot position 2. The configuration of the further phase windings 145 to 143 is corresponding.

Once the stator winding 18 has been inserted into the stator core 17, provision is made for the stator core 17 with the stator winding 18 to be reformed into a ring form with slots 189 oriented radially inwards.

Figure 18:
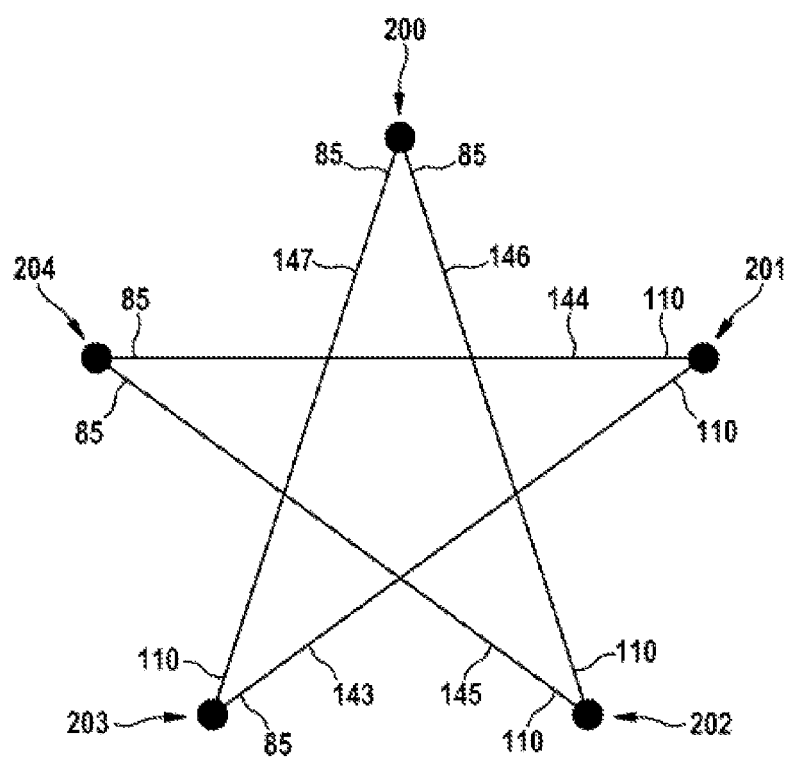
FIG. 18 shows an interconnection of five phase windings.

Provision is made for the five phase windings 143 to 147 in the example, as illustrated in FIG. 18, to be connected to one another. The integration points 200, 201, 202, 203 and 204 are connected in a known manner to a bridge rectifier circuit.

In addition, the text which follows describes a variant of the production method for a stator winding 18. The variation relates to the number of turns 94 of the individual coils 82. While the number of turns 94 is constant in the previously described embodiments and is three per coil, which results in six conductors per slot 189, it is also possible with the method described in principle here to achieve an uneven number of conductors per slot 189.

For this purpose, one coil 82 is wound after the other as illustrated in FIG. 2a, but this coil chain initially has eight coils 82.1 to 82.8, which each have three turns 94, given in total sixteen successive coils 82. The following eight coils 82.9 to 82.16 each have, for example, two turns 94. The following steps are implemented precisely as in the figures up to and including FIG. 9 with respect to the first eight coils 82.1 to 82.8. With respect to the following eight coils 82.9 to 82.16, a similar method is followed. The coil sides 88 are thus positioned next to one another, when viewed from right to left in respect of FIG. 5b, as follows after the embossing of the coil sides 88 for example in the coil 82.9: the coil side 88.1 is followed by the coil side 88.3, this coil side 88.3 is followed by the coil side 88.2 and finally the coil side 88.4 follows. The steps as in the figures up to and including FIG. 9 can easily be implemented analogously.

With reference to FIG. 10, the only change for the variant described here is that the right coils 82 starting with and including coil 82.9 would have only two turns 94.1 and 94.2, between which a plane 140 would likewise need to be entered.

With reference to FIG. 11, provision is made in a further step for each precursor 103 to be reformed. For this, the following condition needs to be met: each phase winding or the precursor 103 thereof has in each case at least two coils connected in series, in this case 82.8 and 82.9, for example, which are in this case connected in series by the coil connector 97.8. Each coil 82.8 or 82.9 has a plane 140 between the two groups 125 and 128. In accordance with the provided method step, provision is made for the at least two coils 82.8 (three turns 94) and 82.9 (two turns 94) to be arranged with respect to one another in such a way that their respective planes 140 are arranged at an angle α with respect to one another of less than 180 angular degrees (as in FIG. 11).

Analogously to FIG. 12, the precursors 103 would also be inserted one inside the other in accordance with this exemplary embodiment and would also be folded one on top of the other analogously.

With reference to FIG. 13, a subgroup 165 would then have the following configuration: starting from the coil connectors 97.8, a winding overhang 162 with five groups 128 would be produced on the right-hand side, with this winding overhang 162 likewise having groups 128 with three wire sections. The groups 128 to the left of the winding overhang 162 would, on the other hand, consist of in each case two wire sections positioned one on top of the other. The groups 125 directly above would then have three wire sections positioned one on top of the other. The five groups 125 to the left would have in turn only two wire sections positioned one on top of the other. By virtue of the subgroups 165 likewise resulting being folded over, the above-described winding overhang 162 (three conductor sections one above the other) would result, analogously to FIG. 16, with this winding overhang being adjoined on the left by that section of the stator winding 18 which is denoted by the reference numeral 174 and which has, with five conductor sections one above the other, the final state of the stator winding 18. A left-hand winding overhang which is produced (not illustrated here) would have a height of two conductor sections.

The invention claimed is:

1. An electric machine, comprising:
    a stator winding including at least one phase winding having a plurality of coils, each respective coil of the plurality of coils being wound a plurality of turns in one rotational direction; and
    a stator core including a plurality of slots directed radially inwardly and in which the at least one phase winding is positioned,
    wherein a first turn of the plurality of turns includes a first coil side and a second coil side and a last turn of the plurality of turns includes a second to last coil side and a last coil side,
    wherein the first coil side is integrally directly connected to a first coil connector and the last coil side is integrally directly connected to a second coil connector, and
    wherein the first coil side is positioned in a radially outermost position in a first slot of the plurality of slots, and the last coil side is positioned in a radially innermost position in a second slot of the plurality of slots.

2. The electric machine of claim 1, wherein the electric machine is an alternator.

3. The electric machine of claim 1, wherein:
    the first coil side and the second to last coil side are located in a first coil group and the second coil side and the last coil side are located in a second coil group, and the first coil group and the second coil group are spaced apart from one another.

4. The electric machine of claim 3, wherein the two coil groups each have an equal number of coil sides.

5. The electric machine of claim 3, wherein the first coil side and the second to last coil side of the first coil group are fixedly connected to one another by a first connecting mechanism and the second coil side and the last coil side of the second coil group are fixedly connected to one another by a second connecting mechanism.

6. The electric machine of claim 5, wherein the first and second connecting mechanisms are an adhesive.

7. The electric machine of claim 1, wherein at least one of the first, second, second to last, and last coil sides is embossed.

8. The electric machine of claim 1, wherein:
    the first coil side of a first coil of the plurality of coils is integrally connected to the last coil side of a second coil of the plurality of coils via the first coil connector, and
    the last coil side of the first coil is integrally connected to the first coil side of a third coil of the plurality of coils via the second coil connector.

9. The electric machine of claim 8, wherein:
    each respective coil of the plurality of coils includes a first coil side connector connecting the first coil side to the second coil side and a second coil side connector connecting the second to last coil side to the last coil side,
    the first coil connector connecting the first and second coils crosses the first and second coil side connectors of a fourth coil of the plurality of coils that is positioned at least partially between the first and second coils, and
    the second coil connector connecting the first and third coils crosses the first and second coil side connectors of a fifth coil of the plurality of coils that is positioned at least partially between the first and third coils.

* * * * *